US008973121B2

(12) United States Patent
Liu (10) Patent No.: US 8,973,121 B2
(45) Date of Patent: Mar. 3, 2015

(54) METHOD AND SYSTEM FOR VISITING A THIRD PARTY APPLICATION VIA A CLOUD PLATFORM

(75) Inventor: Yang Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/110,367

(22) PCT Filed: Feb. 2, 2012

(86) PCT No.: PCT/CN2012/070840
§ 371 (c)(1),
(2), (4) Date: Oct. 7, 2013

(87) PCT Pub. No.: WO2012/136083
PCT Pub. Date: Oct. 11, 2012

(65) Prior Publication Data
US 2014/0033291 A1 Jan. 30, 2014

(30) Foreign Application Priority Data
Apr. 7, 2011 (CN) .......................... 2011 1 0086337

(51) Int. Cl.
G06F 21/31 (2013.01)
H04L 29/06 (2006.01)
H04L 29/08 (2006.01)
(52) U.S. Cl.
CPC .............. *H04L 63/083* (2013.01); *H04L 67/20* (2013.01); *H04L 63/08* (2013.01); *H04L 67/1097* (2013.01)
USPC .......................................................... 726/7
(58) Field of Classification Search
CPC ................................ H04L 29/06; G06F 21/31
USPC .......................................................... 726/7
See application file for complete search history.

(56) References Cited

U.S. PATENT DOCUMENTS

2009/0271847 A1   10/2009   Karjala et al.
2011/0265168 A1*  10/2011   Lucovsky et al. .................. 726/7
(Continued)

FOREIGN PATENT DOCUMENTS

CN     1946022 A    4/2007
CN   101197677 A    6/2008
(Continued)

OTHER PUBLICATIONS

Machulak, Maciej P., and Aad Van Moorsel. "Architecture and Protocol for User-Controlled Access Management in Web 2.0 Applications." IEEE Computer Society (2010): 62-71. Print.
(Continued)

*Primary Examiner* — Teshome Hailu
*Assistant Examiner* — Thanh Le
(74) *Attorney, Agent, or Firm* — Harness, Dickey & Pierce, P.L.C.

(57) ABSTRACT

A system and a method for visiting a third party application through a cloud platform are disclosed. The method includes: receiving a cloud platform account and cloud platform password information inputted by a user; searching a stored binding information mapping table according to a third party application selected by the user to obtain the third party application and obtain access information not comprising cleartext password corresponding to the cloud platform account information, and transmitting the access information to the third party application server; and receiving authentication succeed information returned by the third party application server. According to the present disclosure, complexity of user's operations may be reduced when the user logs on frequently and security level of the user for visiting the third party application may be improved.

8 Claims, 4 Drawing Sheets

(56) References Cited

U.S. PATENT DOCUMENTS

2013/0151431 A1* 6/2013 Linton et al. .................. 705/328
2014/0129448 A1* 5/2014 Aiglstorfer .................... 705/44

FOREIGN PATENT DOCUMENTS

CN 101350717 A 1/2009
EP 2257026 A1 12/2010

OTHER PUBLICATIONS

European Search Report for Application No. 12768376.1, dated Sep. 11, 2014.
English Translation of the Written Opinion of the International Searching Authority for PCT/CN2012/070840, along with Chinese Language version; mailed May 10, 2012; ISA/CN.
International Search Report for PCT/CN2012/070840 (in English and Chinese), mailed May 10, 2012; ISA/CN.

* cited by examiner

METHOD AND SYSTEM FOR VISITING A THIRD PARTY APPLICATION VIA A CLOUD PLATFORM

CROSS-REFERENCE TO RELATED APPLICATIONS

This application is a 371 U.S. national phase of International Patent Application No. PCT/CN2012/070840, filed on Feb. 2, 2012 and published in Chinese as WO 2012/136083 on Oct. 11, 2012. This application claims the benefit and priority of Chinese patent application No. 201110086337.5, filed on Apr. 7, 2011. The entire disclosures of each of the above applications are incorporated herein by reference in their entirety for all purposes.

FIELD

The present disclosure relates to computer communications techniques, and more particularly, to a method and a system for visiting a third party application via a cloud platform.

BACKGROUND

With the development of computer communications techniques, more and more users visit service applications via the Internet. For example, the user may visit the Internet to enjoy applications such as information searching and distribution, music downloading, instant messaging, etc.

Generally, a cloud platform loads a third party application via an iframe manner, such that third party operators may distribute their applications on the cloud platform. The third party application may have its own account system and interact with users via the cloud platform. If the user wants to visit the third party application, the user logs on the cloud platform using a cloud platform account and a cloud platform password first. Then, the user inputs a third party application account and third party application password information in a third party application interface displayed on the cloud platform. The third party application account and the third party application password information are transmitted to the third party application platform via the cloud platform. After authentication by the third party application platform succeeds, the user logs on the third party application.

SUMMARY

Examples of the present disclosure provide a system for visiting a third party application via a cloud platform, so as to reduce complexity when a user logs on the third party application frequently and to improve security level of the user when visiting the third party application.

Various examples of the present disclosure also provide a method for visiting a third party application via a cloud platform, so as to reduce complexity when a user logs on the third party application frequently and to improve security level of the user when visiting the third party application.

According to an aspect of the present disclosure, a system for visiting the third party application via the cloud platform is provided. The system includes: a cloud platform server, a binding information server and a third party application server; wherein the cloud platform server is adapted to allocate an identifier for a released third party application, receive a cloud platform account and cloud platform password information inputted by a user;

query the binding information server according to a third party application selected by the user to obtain third party application account information and access information not including cleartext password corresponding to the third party application and the cloud platform password information, and transmit the third party application account information and the access information to the third party application server; and receive authentication succeed information returned by the third party application server;

the binding information server is adapted to store a binding information mapping table of the user, wherein the binding information mapping table comprises the cloud platform account information of the user, a third party application identifier corresponding to the third party application registered by the user, the third party application account information and the access information not including the cleartext password generated and issued by the third party application server; and the third party application server is adapted to receive the third party application account information and the access information not comprising the cleartext password transmitted by the cloud platform server and authenticate the user.

According to another aspect of the present disclosure, a method for visiting a third party application via the cloud platform is provided. The method includes:

receiving a cloud platform account and cloud platform password information inputted by a user;

searching a stored binding information mapping table according to a third party application selected by the user to obtain access information not comprising cleartext password corresponding to the third party application and the cloud platform account information, and transmitting the access information to a third party application server; and receiving authentication succeed information returned by the third party application server.

It can be seen from the above technical solution that, in the system and method for visiting the third party application via the cloud platform provided by the examples of the present disclosure, the cloud platform account and the cloud platform password information inputted by the user are received. According to a third party application selected by the user, the binding information mapping table is searched to obtain the third party application account information and the access information not including the cleartext password corresponding to the third party application and the cloud platform account information. The third party application account information and the access information are transmitted to the third party application server which authenticates the user according to the third party application account information and the access information not including the cleartext password and returns an authentication result. According to the technical solution of the present disclosure, the cloud platform server may bind the cloud platform account information and the third party application account information, which is convenient to users and reduces the complexity of user's operations when logging on frequently. At the same time, the cloud platform server does not save the cleartext password with which the user logs on the third party application and the cleartext password is not transmitted in network communication, which effectively improves security level of the user when visiting the third party application.

DETAILED DESCRIPTION

The present disclosure will be described in further detail hereinafter with reference to accompanying drawings and examples to make the technical solution and merits therein clearer.

Figure 1:
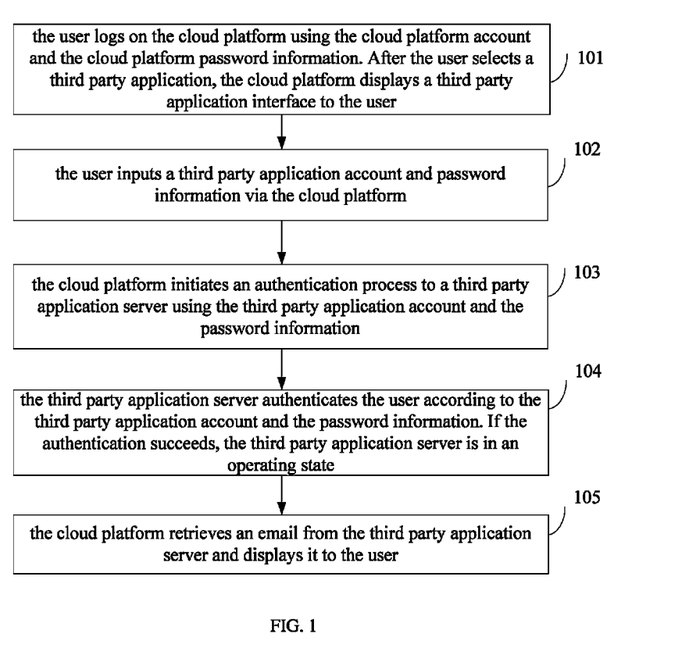
FIG. 1 is a flowchart illustrating a method for visiting a third party application via a cloud platform according to a conventional system.

FIG. 1 is a flowchart illustrating a method for visiting a third party application via a cloud platform according to a conventional system. As shown in FIG. 1, the method includes the following.

At block 101, the user logs on the cloud platform using a cloud platform account and cloud platform password information. After the user selects a third party application, the cloud platform displays a third party application interface to the user.

At block 102, the user inputs a third party application account and password information via the cloud platform.

At block 103, the cloud platform initiates an authentication process to a third party application server using the third party application account and the password information.

At block 104, the third party application server authenticates the user according to the third party application account and the password information. If the authentication succeeds, the third party application server is in an operating state.

At block 105, the cloud platform retrieves an email from the third party application server and displays it to the user.

It can be seen from the above that, in the conventional method for visiting the third party application via the cloud platform, the user is required to input the third party application account and the password information on the cloud platform each time the user logs on the third party application, which makes it complicated when the user logs on frequently. At the same time, the cloud platform needs to input and transmit the third party application account and the password information with which the user logs on the third party application, which may bring risks to the information security of the user.

In the conventional method for visiting the third party application via the cloud platform, the user is required to input third party application account information and password information used for logging on the third party application. Thus, illegal users may obtain the third party application password information of the user via the cloud platform. In addition, during the transmission of the third party password information from the cloud platform to the third party application server, the third party password information may be seized, which makes it unsafe for visiting the third party application.

OAUTH protocol provides a safe, open and simple standard for authentication of user resources. Different from conventional authentication manners, in the authentication of the OAUTH, the third party does not touch the password information of the user, i.e., the third party may obtain the authentication of the user resources without the password information of the user. Therefore, the OAUTH is safe. Detailed information of the OAUTH may be seen from related references and will be not be described herein. In various examples of the present disclosure, the third party application server authenticates the user from the cloud platform based on the OAUTH protocol, or, the cloud platform transmits encrypted password information, so as to improve the security level of the user.

Figure 2:
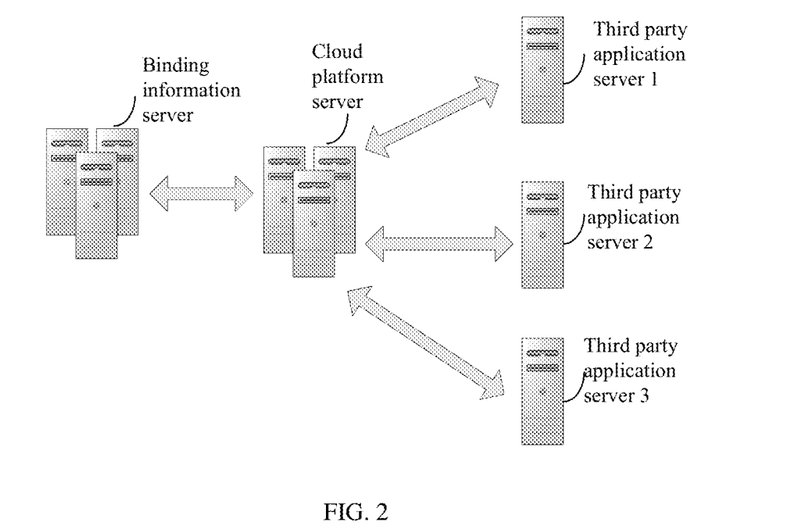
FIG. 2 is a schematic diagram illustrating a system for visiting a third party application via the cloud platform according to an example of the present disclosure.

FIG. 2 is a schematic diagram illustrating a system for visiting a third party application via the cloud platform according to an example of the present disclosure. As shown in FIG. 2, the system includes: a cloud platform server 201, a binding information server 202 and a third party application server 203.

The cloud platform server 201 is adapted to allocate an identifier for a released third party application, receive a cloud platform account and cloud platform password information inputted by a user, and display applications provided by the cloud platform; and adapted to query the binding information server 202 according to a third party application selected by the user to obtain third party application account information and access information not including cleartext password corresponding to the third party application and the cloud platform account information, and transmit them to the third party application server 203; and adapted to receive authentication succeed information returned by the third party application server 203, retrieve the third party application from the third party application server 203 and display the third party application to the user. In an example of the present disclosure, the access information not including the cleartext password may be access token information corresponding to the third party application password or encrypted third party application password information.

The binding information server 202 is adapted to store a binding information mapping table, wherein the binding information mapping table includes the cloud platform account information of the user, a third party application identifier corresponding to the third party application the user registered, the third party application account information and the access information not including the cleartext password generated and issued by the third party application server 203, e.g., the access token information or the encrypted third party application password information.

In this example, the binding information server 202 may store the binding information mapping table in a Key-Value manner.

The cloud platform account information and the third party application identifier are Keys. The third party application account information and the access information not including the cleartext password with which the user logs on the third party application are Values. For example, the Value may be the third party application account information and the access token used for logging on the third party application, or, may be the third party application account information and the encrypted third party password information.

The third party application server 203 is adapted to receive the third party application account information and the access information not including the cleartext password transmitted by the cloud platform server 201, e.g., receive the third party application account information and the access token information, or receive the third party application account information and the encrypted third party application password information, and is adapted to authenticate the user and return authentication succeed information to the cloud platform server 201 if the authentication succeeds.

In examples of the present disclosure, the third party application server 203 searches a mapping relationship table between access tokens and third party application password information according to the received access token information, obtains the third party password information corresponding to the access token, or, decrypt the encrypted third party application password information to obtain the third party application password information. Then the user is authenticated according to the third party application account information and the third party application password information. Detailed authentication process may be obtained from relevant references and will not be described herein.

In a practical application, after the cloud platform server 201 queries the binding information server 202, if the third party application account information corresponding to the cloud platform account information is not found, the cloud platform is further adapted to receive the third party application account information and the third party application password information inputted by the user, encrypt the third party application password information and transmit a registration request to the third party application server 203, wherein the registration request carries the third party application account information and the encrypted third party application password information. After the registration authentication of the third party application server 203, access information not including the cleartext password corresponding to the third party application password information is generated and outputted to the cloud platform server 201. For example, after the access token information corresponding to the third party application password information is generated according to the OAUTH protocol or after the decrypted third party application password information is encrypted again, the access token information or the encrypted third party application password information is outputted to the cloud platform server 201. The cloud platform server 201 generates a binding information mapping table according to the access token information or the encrypted third party application password information returned by the third party application server 203 and outputs the binding information mapping table to the binding information server 202.

Hereinafter, examples of the present disclosure are described based on FIG. 2.

Figure 3:
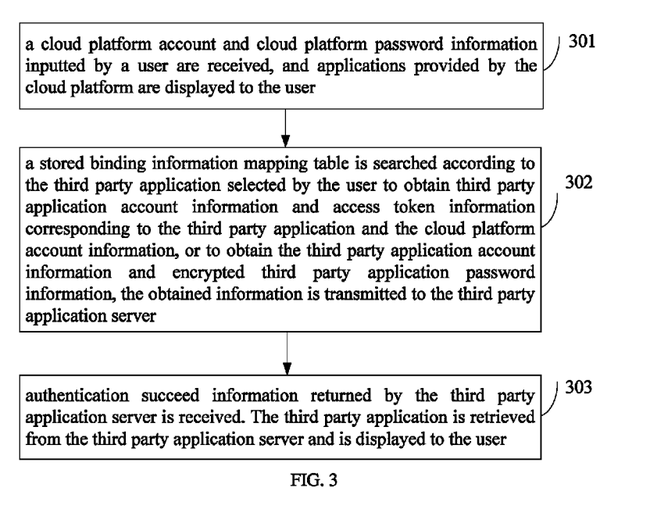
FIG. 3 is a flowchart illustrating a method for visiting a third party application via the cloud platform according to an example of the present disclosure.

FIG. 3 is a flowchart illustrating a method for visiting a third party application via a cloud platform according to an example of the present disclosure. As shown in FIG. 3, the method includes the following.

At block 301, a cloud platform account and cloud platform password information inputted by a user are received, and applications provided by the cloud platform are displayed to the user.

In this block, the user inputs user name information and the cloud platform password information via a browser of a user device. After authentication, the cloud platform server 201 displays applications provided by the cloud, including various applications released by various third party application servers 203 on the cloud platform server 201.

Preferably, the cloud platform server 201 allocates an identifier for each third party application released by the third party application servers 203.

At block 302, a stored binding information mapping table is searched according to the third party application selected by the user to obtain third party application account information and access token information corresponding to the third party application and the cloud platform account information, or to obtain the third party application account information and encrypted third party application password information, the obtained information is transmitted to the third party application server 203.

In this block, the binding information server 202 stores the binding information mapping table which includes the cloud platform account information of the user, the identifier of the third party application corresponding to the third party application that the user registers, the third party application account information and the access token information generated and issued by the third party application server 203 or the encrypted third party application password information.

The binding information mapping table stores a mapping relationship in a Key-Value manner. The cloud platform account information and the third party application identifier are Keys in the binding information mapping table. The third party application account information and the access token with which the user logs on the third party application or the third party application account information and the encrypted third party application password information are Values in the binding information mapping table.

The searching the stored binding information mapping table further includes the following.

If the binding information mapping table does not include the third party application account information corresponding to the cloud platform account information, prompting the user to perform a registration procedure;

receiving the third party application account information and the third party application password information inputted by the user, encrypting the third party application password information and transmitting a registration request to the third party application server 203, wherein the registration request includes the third party application account information and the encrypted third party application password information;

after performing a registration authentication, the third party application server 203 generating an access token corresponding to the third party application password information according to the OAUTH protocol or encrypting the decrypted third party application password information again, and outputting the access token or the re-encrypted third party application password information to the cloud platform server 201; and the cloud platform server 201 generating the binding information mapping table and storing the binding information mapping table according to the access token or the re-encrypted third party application password information returned by the third party application server 203.

At block 303, authentication succeed information returned by the third party application server 203 is received. The third party application is retrieved from the third party application server 203 and is displayed to the user.

In this block, the third party application server 203 searches the stored mapping relationship table between access tokens and third party application password information according to the received access token information, obtains the third party application password information corresponding to the access token information, or decrypts the encrypted third party application password information to obtain the third party application password information. Then, the user is authenticated according to the third party application account information, the third party application password information and a user registration information database pre-stored. After the authentication succeeds, authentication succeed information is returned to the cloud platform server 201.

Figure 4:
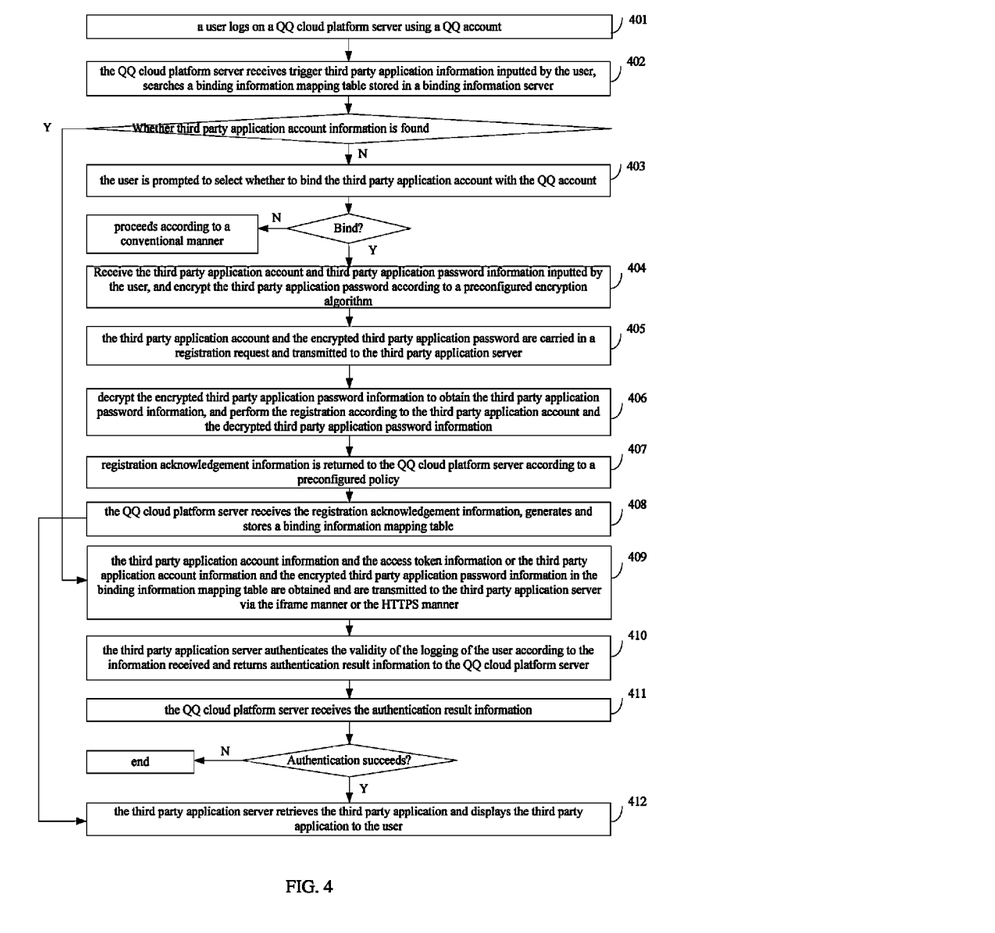
FIG. 4 is a flowchart illustrating a detailed method for visiting a third party application via the cloud platform according to an example of the present disclosure.

FIG. 4 is a flowchart illustrating a detailed process for visiting a third party application via a cloud platform according to an example of the present disclosure. As shown in FIG. 4, a QQ cloud platform is taken as an example cloud platform in this example. It should be noted that the solution of the present disclosure is applicable for all cloud platforms and is not limited to the QQ cloud platform. The method includes the following.

At block 401, a user logs on a QQ cloud platform server using a QQ account.

In this block, the QQ account includes: QQ user name information (QQ number) and QQ password information.

At block 402, the QQ cloud platform server receives trigger third party application information inputted by the user, searches a binding information mapping table stored in a binding information server, if third party application account information corresponding to a third party application and the QQ account information are found, block 409 is performed; otherwise, block 403 is performed.

In this block, the user selects an application to be logged on from applications displayed by the QQ cloud platform server and triggers to input the trigger third party application information to the QQ cloud platform server. The QQ cloud platform server searches the binding information mapping table stored in the binding information server, according to the QQ account information used for logging on the third party application and a third party application identifier corresponding to the third party application selected by the user, for the third party application account information corresponding to the third party application selected by the user and the QQ account information. If the third party application account information is found, it indicates that the user logs on not the first time, and a binding relationship between the third party application account and the QQ account has been configured. If the third party application account information corresponding to the third party application selected by the user and the QQ account information is not found, it indicates that the user logs on the third party application for the first time. When the user logs on the third party application using the third party application account, the user may be prompted to bind the third party application account with the QQ account, such that the user does not need to input the third party application account and the third party application password information each time he logs on the third party application, which may reduce operations of the user and lower the risk that the password information being seized during transmission.

At block 403, the user is prompted to select whether to bind the third party application account with the QQ account; if the user selects to bind, block 404 is performed; otherwise, the method proceeds according to a conventional manner.

At block 404, the third party application account and third party application password information inputted by the user are received, and the third party application password is encrypted according to a preconfigured encryption algorithm.

In this block, the QQ cloud platform server encrypts the third party application password inputted by the user and may store the encrypted third party application password. An existing encryption algorithm may be adopted. Thus, the risk that the third party application password is seized may be decreased.

At block 405, the third party application account and the encrypted third party application password are carried in a registration request and transmitted to the third party application server.

At block 406, the third party application server decrypts the encrypted third party application password information to obtain the third party application password information, and performs the registration according to the third party application account and the decrypted third party application password information.

In this block, the registration procedure of the third party application server may be obtained from related references and will not be described herein.

At block 407, registration acknowledgement information is returned to the QQ cloud platform server according to a preconfigured policy.

In this block, the third party application server generates the access token corresponding to the third party application password information according to the OAUTH protocol based on the decrypted third party application password information according to a preconfigured policy, e.g. a policy to improve the security level of the user when visiting the third party application. A mapping relationship between the access token and the third party application password is established. The mapping relationship between the third party application password and the access token is stored and the third party application account information is also stored. The third party application server puts the access token information in the registration acknowledgment information and transmits the registration acknowledgement information to the QQ cloud platform server via an iframe manner or a Hypertext Transfer Protocol over Secure Socket Layer (HTTPS) manner. Certainly, the access token may be encrypted.

HTTPS is a HTTP tunnel which has an objective of security, i.e., HTTPS is security version HTTP. The security basic of HTTPS is SSL which is an abstract URL scheme. The syntax of SSL is similar to that of HTTP scheme. It is used for providing identity authentication and encryption for security HTTP data transmission. It is widely used for security-sensitive communications on the Internet, e.g., trade and payment related operations.

It should be noted that, the third party application server only needs to generate a random token and save the third party application account and the third party application password of the user by using the random token as a value. It is not required that the token must be generated according to the OAUTH protocol.

In a practical application, the third party application server may also use the originally encrypted third party application password information, or, may encrypt the decrypted third party application password information again, and takes the encrypted third party application password information as a part of authentication information for logging on the third party application. In addition, there may be one or more third party application servers, each of which has logical functions for implementing service provided by it. The detailed description may be obtained from related references and will not be described herein.

At block 408, the QQ cloud platform server receives the registration acknowledgement information, generates and stores a binding information mapping table. Then, block 412 is performed.

In this block, if the registration acknowledgement information includes the access token information, generate a binding information mapping table in the Key-Value manner, wherein the QQ account information and the third party application identifier are Keys in the binding information mapping table, the third party application account information and the access token with which the user logs on the third party application are Values in the binding information mapping table. If the registration acknowledgement information includes the encrypted third party application password information, the third party application account information with which the user logs on the third party application and the encrypted third party password information correspond to the Values in the binding information mapping table. If the registration acknowledgement information include neither the access token information nor the encrypted third party application password information, the third party application account information with which the user logs on the third party application and the stored encrypted third party application password information correspond to the Values in the binding information mapping table.

In a practical application, for each third party application that the user needs to visit, a corresponding binding information mapping table may be generated. The access tokes and re-encrypted third party application password information in different binding information mapping tables are different. Thus, even if the illegal user obtains the information, he can visit only the corresponding third party application, which effectively protects the other third party applications of the user.

After the binding information mapping table is generated, a QQ cloud platform server Application Programming Interface (API) is called to output the binding information mapping table to the binding information server for storage, so as to facilitate the user to use the third party application the next time. When the third party application is loaded, the QQ cloud platform server retrieves the bound third party application account and the access token information according to the QQ account, or retrieves the third party application account and the encrypted third party application password information. The third party application account and the access token information, or the third party application account and the encrypted third party application password information are transmitted to the third party application server via the iframe manner or HTTPS manner.

At block 409, the third party application account information and the access token information in the binding information mapping table are obtained and are transmitted to the third party application server via the iframe manner or the HTTPS manner, or the third party application account information and the encrypted third party application password information in the binding information mapping table are obtained and are transmitted to the third party application server via the iframe manner or the HTTPS manner.

In this block, when the information is transmitted via the iframe manner or the HTTPS manner, Uniform Resource Locator (URL) information may be utilized. For example, HTTPS://www.abc.com/webstore/
load?appid=1001&abc_u=aaa&abc_p=papapa, wherein www.abc.com denotes the domain name of the third party application, 1001 denotes the application identifier of the third party application, aaa denotes the third party application account of the user for logging on the third party application, papapa denotes the encrypted third party application password.

Furthermore, the QQ cloud platform server may provide a storage interface for the access token or the encrypted password, so as to facilitate the third party application developers to call.

At block 410, the third party application server authenticates the validity of the logging of the user according to the information received and returns authentication result information to the QQ cloud platform server.

In this block, if what are received by the third party application server are the third party application account information and the access token information, the third party application password information is obtained according to access token information. If what are received by the third party application server are the third party application account information and the encrypted third party application password information, the encrypted third party application password information is decrypted to obtain the real third party application password information. The validity of the logging of the user is authenticated according to the third party application account information and the obtained third party application password information. If the logging is valid, authentication result information indicating that the authentication succeeds is returned to the QQ cloud platform server. If the logging is invalid, authentication result information indicating that the authentication fails is returned to the QQ cloud platform server.

At block 411, the QQ cloud platform server receives the authentication result information, if it is determined that the authentication succeeds, block 412 is performed; otherwise, the method ends.

At block 412, the third party application server retrieves the third party application and displays the third party application to the user.

It can be seen from the above that, in the system and method for visiting the third party application via the cloud platform provided by the examples of the present disclosure, the cloud platform account and the cloud platform password information inputted by the user are received. Applications provided by the cloud platform are displayed to the user. According to a third party application selected by the user, the binding information mapping table is searched to obtain the third party application account information and the access token information corresponding to the third party application and the cloud platform account information, or obtain the third party application account information and the encrypted third party application password information. The third party application account information and the access token information or the encrypted third party application password information are transmitted to the third party application server. An authentication result returned by the third party application server is received. The third party application is retrieved from the third party application server and is displayed to the user. Thus, the cloud platform server may bind the cloud platform account information and the third party application account information, which is convenient to users and reduces the complexity of user's operations when logging on frequently. At the same time, the cloud platform server does not save the cleartext password used for logging on the third party application and the cleartext password is not transmitted in network communication. In addition, the access token and/or the encrypted third party application password are transmitted according to HTTPS, which ensures that the access token and/or the encrypted third party application password are not seized, tampered, or leaked. Since the real third party application password is decrypted or retrieved by the third party application server, the cloud platform becomes more reliable. In addition, in a practical application, the user may use multiple third party applications and configure the same password information for them. The third party application may also integrate multiple account systems of other platforms. In examples of the present disclosure, the third party application server may generate the access token with respect to the third party application password. Thus, even if the access token is stolen by a Trojan horse at the user's browser, the stealer cannot log on other third party application servers except for the third party application bound with the cloud platform, which effectively ensures the security of the user when visiting other third party applications and protect the user's experience from being hurt.

The above examples may be implemented by hardware, software, firmware, or a combination thereof. For example the various methods, processes and functions described herein may be implemented by a processor (the term processor is to be interpreted broadly to include a CPU, processing module, or logic module, etc.). The processes, methods and functions may all be performed by a single processor or split between several processors; reference in this disclosure or the claims to a 'processor' should thus be interpreted to mean 'one or more processors'. The processes, methods and functions are implemented as machine readable instructions executable by one or more processors, hardware logic circuitry of the one or more processors or a combination thereof. Further, the examples disclosed herein may be implemented in the form of a software product. The computer software product is stored in a non-transitory storage medium and comprises a plurality of instructions for making a computer device (which may be a personal computer, a server or a network device, etc.) implement the method recited in the examples of the present disclosure.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A system for visiting a third party application via a cloud platform, comprising: a cloud platform server, a binding information server and a third party application server; wherein
the cloud platform server is adapted to
allocate an identifier for a released third party application, receive a cloud platform account and cloud platform password information inputted by a user;
query the binding information server according to a third party application selected by the user to obtain third party application account information and access information not including cleartext password corresponding to the third party application and the cloud platform password information, and transmit the third party application account information and the access information to the third party application server; and
receive authentication succeed information returned by the third party application server;
the binding information server is adapted to store a binding information mapping table of the user, wherein the binding information mapping table comprises the cloud platform account information of the user, a third party application identifier corresponding to the third party application registered by the user, the third party application account information and the access information not including the cleartext password generated and issued by the third party application server; and
the third party application server is adapted to receive the third party application account information and the access information not comprising the cleartext password transmitted by the cloud platform server and authenticate the user.

2. The system of claim 1, wherein the binding information server is adapted to store the binding information mapping table in a Key-Value manner, wherein the cloud platform account information and the third party application identifier are Keys, the third party application account information with which the user logs on the third party application and the access information not comprising the cleartext password are Values.

3. The system of claim 2, wherein the cloud platform server is further adapted to receive, if the third party application account information corresponding to the cloud platform account information is not obtained after querying the binding information server, the third party application account information and third party application password information inputted by the user,
encrypt the third party application password information, put the third party application account information and the encrypted third party application password information in a registration request,
transmit the registration request to the third party application server, wherein the third party application server generates access information not comprising the cleartext password corresponding to the third party application password information after performing a registration authentication and outputs the access information to the cloud platform server; and
generate the binding information mapping table according to the access information not comprising the cleartext password returned by the third party application server, and output the binding information mapping table to the binding information server.

4. The system of claim 1, wherein the access information not comprising the cleartext password is access token information corresponding to the third party application password, or encrypted third party application password information.

5. A method for visiting a third party application via a cloud platform, comprising:
receiving a cloud platform account and cloud platform password information inputted by a user;
searching a stored binding information mapping table according to a third party application selected by the user to obtain access information not comprising cleartext password corresponding to the third party application and the cloud platform account information, and transmitting the access information to a third party application server; and
receiving authentication succeed information returned by the third party application server;
wherein the access information not comprising the cleartext password is access token information corresponding to the third party application password or encrypted third party application password information;
wherein the receiving the authentication succeed information returned by the third party application server comprises:
searching, by the third party application server, a stored mapping relationship table between access tokens and third party application password information according to the access token information received, obtaining the third party application password information corresponding to the access token, or decrypting the encrypted third party application password information to obtain the third party application password information; and
authenticating the user according to the third party application account information, the third party application password information and a pre-stored user registration information database, and returning the authentication succeed information to the cloud platform server after the authentication succeeds.

6. The method of claim 5, wherein the binding information mapping table comprises: the cloud platform account information of the user, a third party application identifier corresponding to the third party application registered by the user, the third party application account information and the access information not comprising the cleartext password generated and issued by the third party application server.

7. The method of claim 6, wherein the binding information mapping table is stored in a Key-Value manner, wherein the cloud platform account information and the third party application identifier are Keys, the third party application account information with which the user logs on the third party application and the access information not comprising the cleartext password are Values.

8. The method of claim 7, wherein the searching the binding information mapping table further comprises:
- if the third party application account information corresponding to the cloud platform account information is not found in the binding information mapping table, prompting the user to execute registration information;
- receiving the third party application account information and third party application password information inputted by the user, encrypting the third party application password information, putting the third party application account information and the encrypted third party application password information in a registration request and transmitting the registration request to the third party application server;
- after a registration authentication succeeds, generating, by the third party application server, access information not comprising the cleartext password corresponding to the third party application password information and outputting the access information to the cloud platform server; and
- generating and storing, by the cloud platform server, the binding information mapping table according to the access information not comprising the cleartext password returned by the third party application server.

* * * * *